July 31, 1962
C. J. BEAN
3,047,314
COUPLINGS FOR AIRCONDITIONING DUCTS MADE FROM
CORRUGATED PAPER MATERIAL
Filed July 2, 1958
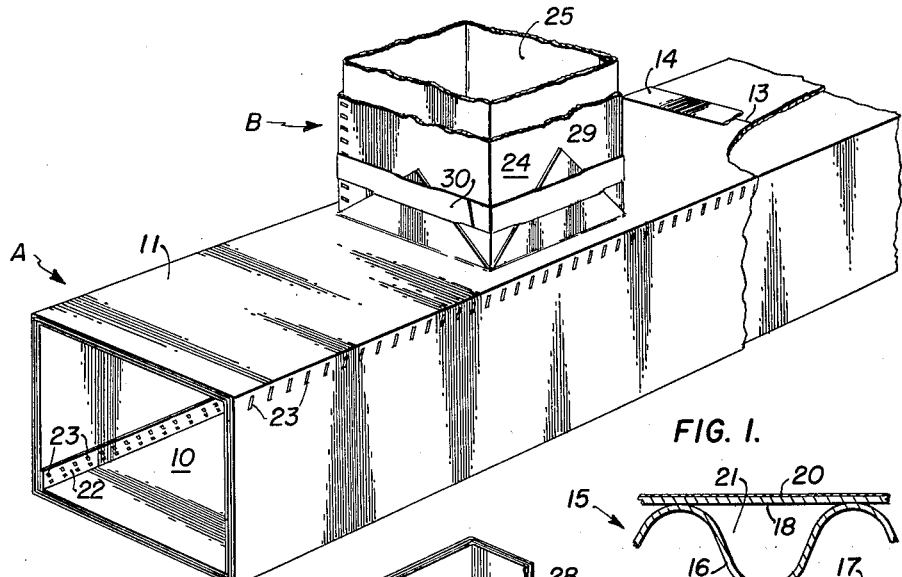
FIG. 1.
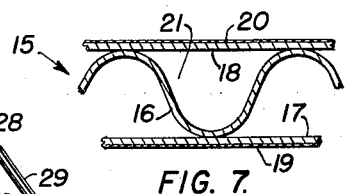
FIG. 7.
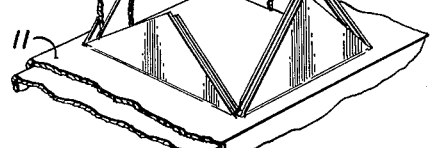
FIG. 2.
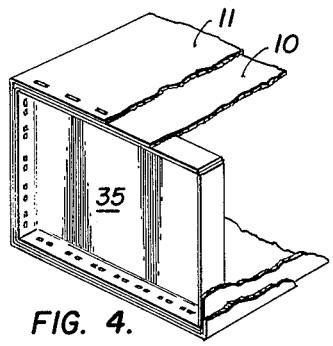
FIG. 4.
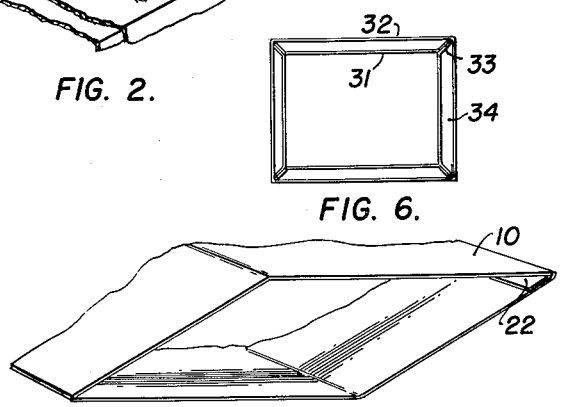
FIG. 6.
FIG. 5.
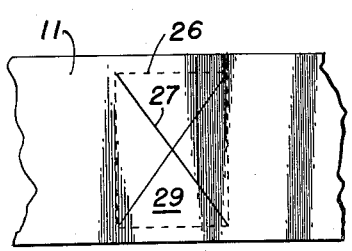
FIG. 3.
CHARLES J. BEAN
INVENTOR.
BY *Herbert J. Brown*
ATTORNEY

United States Patent Office 3,047,314
Patented July 31, 1962

3,047,314
COUPLINGS FOR AIRCONDITIONING DUCTS MADE FROM CORRUGATED PAPER MATERIAL
Charles J. Bean, Fort Worth, Tex., assignor to First Container Corporation, Fort Worth, Tex., a corporation of Texas
Filed July 2, 1958, Ser. No. 746,270
2 Claims. (Cl. 285—55)

This invention relates to air conditioning and has reference to an improved duct for conducting both warm and cool air from a heating or cooling source to the interior of a room.

The primary object of the invention is to provide a light weight and inexpensive duct for the prescribed purpose.

Another object of the invention is to provide an air conditioning duct which may be readily assembled and installed without the use of highly skilled labor.

Another object of the invention is to provide a light weight airconditioning duct which does not require additional insulating material therearound after the same has been installed.

These and other objects of the invention will become apparent from the following description and the accompanying drawing, wherein:

FIGURE 1 is a broken perspective view of a preferred form of the invention.

FIGURE 2 is a broken perspective view of the upper center portion illustrated in FIGURE 1, and showing additional parts broken away so as to better illustrate the connection between a primary duct and a secondary duct.

FIGURE 3 is a broken plan view of a duct surface and showing crossed splits and scored lines therein used for forming an outlet duct connection.

FIGURE 4 is a broken perspective showing the end of a duct and a closure panel therefor.

FIGURE 5 is a broken perspective view showing a partially collapsed or folded position of a duct for shipping.

FIGURE 6 is an end view of a modified form of the invention, and

FIGURE 7 is an enlarged sectional view of material employed in the present invention.

The form of the invention shown includes inner and outer multiple sleeves 10 and 11 which are slidably received, one within the other, and the respective connecting sleeves have abutting ends 13 in staggered relation relative to the length of the duct A thus formed. The adjoining sleeve ends 13 are connected and are covered by means of pressure sensitive tape 14. Each sleeve 10 and 11 is made of corrugated paper material 15 such as used in corrugated boxes, which material is comprised of inner corrugated medium 16 having inner and outer liners 17 and 18, the outer surfaces of which are covered with metal foil 19 and 20, as by pasting or otherwise bonding the foil in place. The flutes 21 are disposed transversely with respect to the length of the sleeve 10 or 11. Such transverse positioning of the flutes 21 not only lends strength to the assembled duct, but also provides dead air space which acts as an insulating medium.

Initially, rectangular lengths of the material are scored parallel to the sides thereof to facilitate bending when forming corners when making the sleeves 10 and 11, and one free sleeve edge of each sleeve is provided with a stitch flap 22 for receiving the inner ends of staples 23 driven through the outer overlapping edge surface of the adjoining sleeve side. As shown in FIGURE 1, the stitch flaps 22 of the inner and outer sleeves 10 and 11 are at opposite corners of the assembled duct.

A connecting duct B is shown in FIGURES 1 and 2 and is comprised of inner and outer sleeves 24 and 25 which are identical in construction with the described sleeves 10 and 11, but are of smaller transverse dimensions. The coinciding ends of the connecting sleeves 24 and 25 are perpendicularly joined with the first described sleeves 10 and 11 by means of rectangular openings, not numbered, in the latter. These openings are defined by rectangular score lines 26 which are slightly larger than the ends of the sleeves 24 and 25, and which score lines are provided in the outer surfaces of both the inner and outer sleeves 10 and 11. Diagonal slots 27 are formed between opposite corners of the rectangular score lines 26 and thus provide inner and outer triangular tabs 28 and 29 which are bent outwardly at time of installation. The end of the outer sleeve 24 is received between the outwardly projecting tabs 29 and the end of the inner sleeve 25 is received between the inner tabs 28. After being thus assembled, a pressure tape 30 around the outer tabs 29 and in contact with the exposed outer surface of the outer sleeve 24 secures the connection of the ducts A and B.

The modified form of the invention shown in FIGURE 6 is substantially identical with the first described form of the invention, but differs in that the inner sleeve 31 is spaced from the outer sleeve 32. Such spacing is accomplished by providing outwardly and angularly extending flanges 33 at the corners of the inner sleeve 31. The adjacent flanges 33 are stapled to each other and are received in the inner corners of the outer sleeve 32. The outer sleeve 32 is identical in construction with outer sleeve 11 previously described. Such construction and arrangement provide dead air space 34 substantially around the inner sleeve 31 and serves as an insulating means for the duct construction.

In nearly all installations it will be necessary to provide a closure in the end of a duct A or B remote from the source of warm or cool air, and such closure is illustrated in FIGURE 4 wherein a flanged panel 35 is secured, as by means of staples positioned through the duct sleeves 10 and 11, or 24 and 25, and the flanges of said end panel. In some installations it may be necessary to make a right angle turn in the ducts system. This is accomplished by inserting an end panel 35 in the end of a first duct A and then connecting a second duct B near the end thereof as described in connection with FIGURE 2.

The described ducts may be readily installed and secured in place by any suitable means such as lengths of sheet metal, not shown. Preferably, such metal should be of readily bendable material and easily nailable.

The respective sleeves 10 and 11, 24 and 25, may be readily folded along opposite corners, shown in FIGURE 5, for storage and shipping.

In view of the foregoing, it will be obvious that the described constructions may be readily installed by inexperienced labor and that the described constructions may be used for both heating and cooling in airconditioning systems. The foil covered inner sleeves 10 and 25 serve as conductors, whereas the foil covered outer sleeves serve as insulators for the inner sleeves. The foil 19 and 20 also protects the paper construction therebetween when the ducts A and B are conducting warm air.

The described invention is not limited to the exemplary forms of the invention herein shown and described, but may be varied within the scope of the appended claims.

What is claimed is:
1. A duct for conveying warm or cool air, said duct comprising multiple lengths of abutting inner and outer sleeves of corrugated paper material, said corrugated paper consisting of an inner corrugated medium having inner and outer liners covering said corrugated medium, said sleeves being rectilinear in cross section and having corners along the lengths thereof, the abutting end connections of the respective inner and outer sleeves being in staggered relation relative to one another, metal foil covering the outer surfaces of said inner and outer sleeves, and wherein the flutes of said corrugated paper material are transversely disposed with respect to the length of said sleeves, said inner sleeve being spaced from the outer sleeves in which it is received, and the corners of said inner sleeve being provided with angularly extending flanges which engage with the inner corners of said outer sleeves.

2. A duct for conveying warm and cool air as defined in claim 2, and including a lateral duct of the same construction extending therefrom, the connection of said lateral duct with the first said duct being by diagonal slots therein, the resulting triangular tabs of which are disposed outwardly to engage the end of said lateral duct.

References Cited in the file of this patent

UNITED STATES PATENTS

| | | |
|---|---|---|
| 1,690,853 | Behrman | Nov. 6, 1928 |
| 1,813,787 | Webster | July 7, 1931 |
| 1,860,346 | Anderson | May 31, 1932 |
| 2,099,756 | Seigle | Nov. 23, 1937 |
| 2,108,159 | Barman | Feb. 15, 1938 |
| 2,159,948 | Hatch | May 23, 1939 |
| 2,338,801 | Callan | Jan. 11, 1944 |
| 2,355,584 | Douglas | Aug. 8, 1944 |
| 2,401,974 | Siebels | June 11, 1946 |
| 2,434,465 | Marc | Jan. 13, 1948 |
| 2,507,588 | Brandon et al. | May 16, 1950 |
| 2,740,572 | Welshenbach | Apr. 3, 1956 |
| 2,861,598 | Carder et al. | Nov. 25, 1958 |
| 2,893,436 | Mann | July 7, 1959 |
| 2,963,783 | Field | Dec. 13, 1960 |